United States Patent
Perry et al.

(10) Patent No.: US 9,873,519 B2
(45) Date of Patent: Jan. 23, 2018

(54) TANKER AIRCRAFT CAPACITY EXTENSION SYSTEM AND METHOD

(71) Applicant: The Boeing Company, Chicago, IL (US)

(72) Inventors: Steven R. Perry, Shoreline, WA (US); Henry H. Tingler, Snoqualmie, WA (US)

(73) Assignee: The Boeing Company, Chicago, IL (US)

( * ) Notice: Subject to any disclaimer, the term of this patent is extended or adjusted under 35 U.S.C. 154(b) by 184 days.

(21) Appl. No.: 14/824,414

(22) Filed: Aug. 12, 2015

(65) Prior Publication Data
US 2017/0043879 A1    Feb. 16, 2017

(51) Int. Cl.
*B64D 37/06* (2006.01)
*B64D 37/04* (2006.01)
*B64D 39/00* (2006.01)
*B64D 37/24* (2006.01)
B64D 37/32 (2006.01)

(52) U.S. Cl.
CPC ............ *B64D 37/06* (2013.01); *B64D 37/04* (2013.01); *B64D 37/24* (2013.01); *B64D 39/00* (2013.01); *B64D 2037/325* (2013.01)

(58) Field of Classification Search
CPC ........ B64D 37/06; B64D 37/04; B64D 37/24; B64D 37/28; B64D 37/00; B64D 37/14; B64D 37/20
See application file for complete search history.

(56) References Cited

U.S. PATENT DOCUMENTS

| | | | |
|---|---|---|---|
| 3,158,193 A | 11/1964 | Anderson | |
| 4,019,649 A | 4/1977 | Simon | |
| 4,925,057 A | 5/1990 | Childress et al. | |
| 6,889,940 B1 * | 5/2005 | Howe | B64D 37/04 244/135 R |

(Continued)

FOREIGN PATENT DOCUMENTS

| | | |
|---|---|---|
| FR | 2 918 037 | 1/2009 |
| GB | 1153040 | 5/1969 |

(Continued)

OTHER PUBLICATIONS

EP, Extended European Search Report and Opinion; Patent Application No. 16177968.1; 8 pages (Dec. 15, 2016).

(Continued)

*Primary Examiner* — Philip J Bonzell
(74) *Attorney, Agent, or Firm* — Thompson Hine LLP (57) ABSTRACT

A tanker aircraft capacity extension system shaped to fit within an aircraft cargo area may include a first portable fuel container having a first outlet port adapted to connect to an integral fuel system of the aircraft, and a first inlet port; and a second portable fuel container having a second outlet port adapted to connect to the first inlet port and a second inlet port adapted to connect to a third fuel container; when the second outlet port is connected to the first inlet port and the first outlet port is connected to the integral fuel system of the aircraft, fuel flows from the second fuel container, through the outlet port to the first inlet port into the interior of the first container, and out from the first outlet port of the first container.

20 Claims, 6 Drawing Sheets

(56) References Cited

U.S. PATENT DOCUMENTS

| | | | | |
|---|---|---|---|---|
| 7,051,979 B2* | 5/2006 | Howe | ............... | B64D 37/04 244/135 R |
| 7,357,149 B2* | 4/2008 | Howe | ............... | B64D 37/04 137/266 |
| 7,648,103 B2* | 1/2010 | Barbosa | ............... | B64C 17/10 137/587 |
| 7,984,877 B2* | 7/2011 | Hasmann | ............... | B64D 37/06 137/312 |
| 8,851,424 B2* | 10/2014 | Barbosa | ............... | B64C 17/10 244/135 C |
| 2015/0107682 A1* | 4/2015 | Kirk | ............... | B60K 15/035 137/15.09 |

FOREIGN PATENT DOCUMENTS

| | | |
|---|---|---|
| WO | 2005/079205 | 9/2005 |
| WO | 2013/167637 | 11/2013 |

OTHER PUBLICATIONS

Transue, Mark; "Global Services & Support Maintenance, Modifications, & Upgrades" Cabin Auxiliary Fuel Tank (CAFT) System; The Boeing Company; Export Controlled ECCN: EAR99; pp. 1-8 (2013).

* cited by examiner

TANKER AIRCRAFT CAPACITY EXTENSION SYSTEM AND METHOD

TECHNICAL FIELD

The present disclosure relates to auxiliary fuel containers for tanker aircraft, and more particularly, to systems and methods for tanker aircraft fuel capacity extension that utilize the cargo area of an aircraft.

BACKGROUND

Tanker aircraft are used to perform aerial or in-flight refueling, which is the process of transferring aviation fuel from one aircraft, namely the tanker aircraft, to another aircraft during flight. Air refueling increases the endurance of the aircraft receiving fuel from the tanker aircraft, which may extend the range of the aircraft. It is also possible to perform a series of air refuelings, which can further extend the range of the receiving aircraft. Another advantage of air refueling is that it allows the receiving aircraft to take off with a greater payload and a lesser fuel supply, which can be topped off with fuel from a tanker aircraft once the receiving aircraft is airborne and at a cruising altitude.

Tanker aircraft typically include extra fuel tanks located in the aircraft body and in or on the aircraft wings. The fuel tanks both fuel the tanker aircraft propulsion systems, such as jet engines, and contain fuel to be off loaded to the receiving aircraft. Efforts have been made to increase the fuel carrying capacity of tanker aircraft. In one such effort, twin rigid fuel tanks are mounted on a pallet that is rolled into and secured within the cargo area of the tanker aircraft. The tanks are connected to a common conduit that is connected to a fuel port within the cargo area that is connected to fuel tanks integral to the aircraft.

These rigid tanks require a mechanical pump to pump fuel from the tanks through the common conduit and into the fuel port within the cargo area. The tanks can be controlled by the pilot of the tanker aircraft. When the tanks are emptied, they can be rolled off of the tanker aircraft out of the cargo area and refilled.

Although such auxiliary tanks increase the fuel carrying capacity of a tanker aircraft significantly, the design is relatively expensive because it requires additional pumps, and the flow of fuel from the two tanks must be balanced to maintain a consistent center of gravity of the auxiliary tanks within the cargo area. Accordingly, there is a need for an auxiliary or extension fuel system for a tanker and/or cargo aircraft that is relatively low cost, provides a greater capacity for additional fuel than current methods and systems, streamlines integration with existing derivative aircraft systems, and may not require venting as is required of such rigid auxiliary fuel tanks.

SUMMARY

The present disclosure is a tanker aircraft capacity extension system and method that overcomes the disadvantages of prior systems and methods. In one embodiment, a tanker aircraft capacity extension system may be shaped to fit within a cargo area of an aircraft and may include a first fuel container having a first outlet port communicating with an interior of the first fuel container and adapted to connect to an integral fuel system of the aircraft, and a first inlet port communicating with the interior of the first fuel container; and a second fuel container having a second outlet port communicating with an interior of the second fuel container and adapted to connect to the first inlet port of the first fuel container, and a second inlet port communicating with the interior of the second fuel container and adapted to connect to a third fuel container; whereby, when the second outlet port of the second fuel container is connected to the first inlet port of the first fuel container and the first outlet port of the first fuel container is connected to the integral fuel system of the aircraft, fuel flows from the second fuel container, through the second outlet port to the first inlet port into the interior of the first container, and out from the first outlet port of the first container.

In another embodiment, an aircraft capacity extension system may include a plurality of modular fuel container units shaped to fit within a cargo area of an aircraft, each of the modular fuel container units including a separate pallet for rolling on and off of a cargo area of an aircraft and a fuel container mounted on the pallet; each of the fuel containers having an outlet conduit and an inlet conduit; each of the outlet conduits adapted to connect alternatively to the inlet conduit of another one of the plurality of modular fuel container units into a fuel port in the cargo area of the aircraft connected to an aircraft fuel tank; and each of the inlet conduits adapted to connect alternatively to the outlet conduit of another one of the plurality of modular fuel container units and to a source of fuel external to the aircraft; whereby the fuel containers of the plurality of modular fuel container units are connectable in a chain so that fuel stored in each of the containers flows to one of the outlet conduits connected to the fuel port.

In yet another embodiment, a method for extending a fuel capacity of a tanker aircraft may include mounting a plurality of fuel containers on a plurality of pallets shaped to roll on and off of a cargo area of an aircraft to form a plurality of modular fuel container units; attaching an outlet conduit and an inlet conduit to each of the fuel containers, wherein each of the outlet conduits is adapted to connect alternatively to the inlet conduit of another one of the plurality of modular fuel container units into a fuel port in the cargo area of the aircraft connected to the aircraft fuel tanks, and wherein each of the inlet conduits is adapted to connect alternatively to the outlet conduit of another one of the plurality of modular fuel container units into a source of fuel external to the aircraft; and providing each of the outlet conduits with an adjustable outlet valve and each of the inlet conduits with an adjustable inlet valve.

Other objects and advantages of the disclosed tanker aircraft capacity extension system and method will be apparent from the following description, the accompanying drawings, and the appended claims.

DETAILED DESCRIPTION

Figure 1:
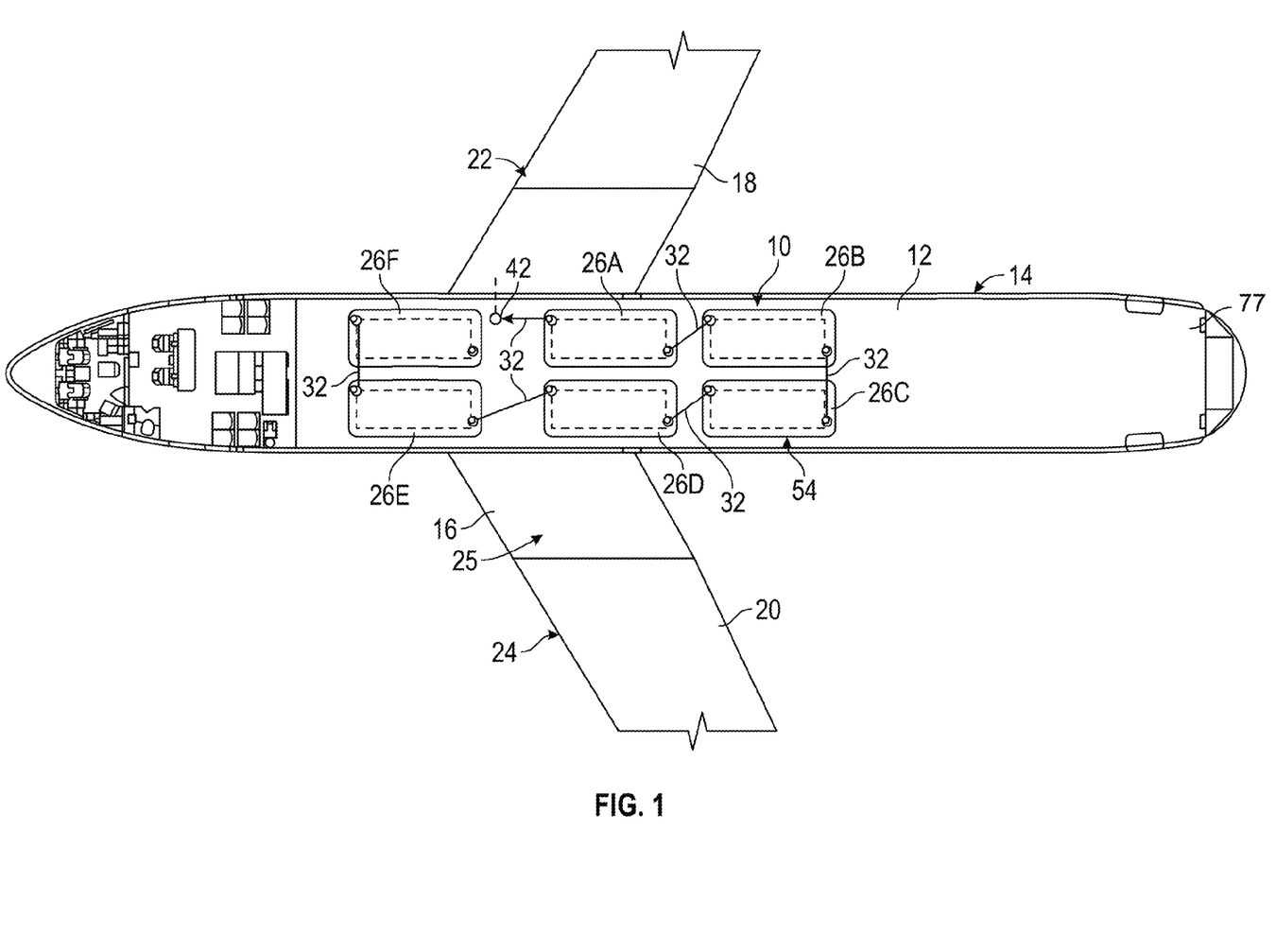
FIG. 1 is a schematic top plan view of a tanker aircraft having an embodiment of the disclosed capacity extension system mounted within its cargo area.

As shown in FIG. 1, an embodiment of the disclosed tanker aircraft capacity extension system, generally designated 10, may be mounted within the cargo area 12 of an aircraft 14, which in an embodiment may be a tanker aircraft. In another embodiment, the aircraft 14 may be a cargo aircraft. The aircraft 14 may include one or more body fuel tanks 16 and one or more main fuel tanks 18, 20 located within the wings 22, 24. One or more, or all of the body fuel tanks 16 and main fuel tanks 18, 20 may make up an integral fuel system 25 of the aircraft 14.

The capacity extension system 10 may include a plurality of modular fuel container units 26A, 26B, 26C, 26D, 26E, and 26F. Although six modular fuel container units 26A-26F are illustrated in FIG. 1, it is within the scope of this disclosure to provide a system 10 having a lesser or greater plurality of modular fuel container units 26. In an embodiment, the system 10 may include at least two modular fuel container units 26 that are positioned within the cargo area 12 at predetermined locations selected to provide a balanced load to the aircraft 14.

Figure 2:
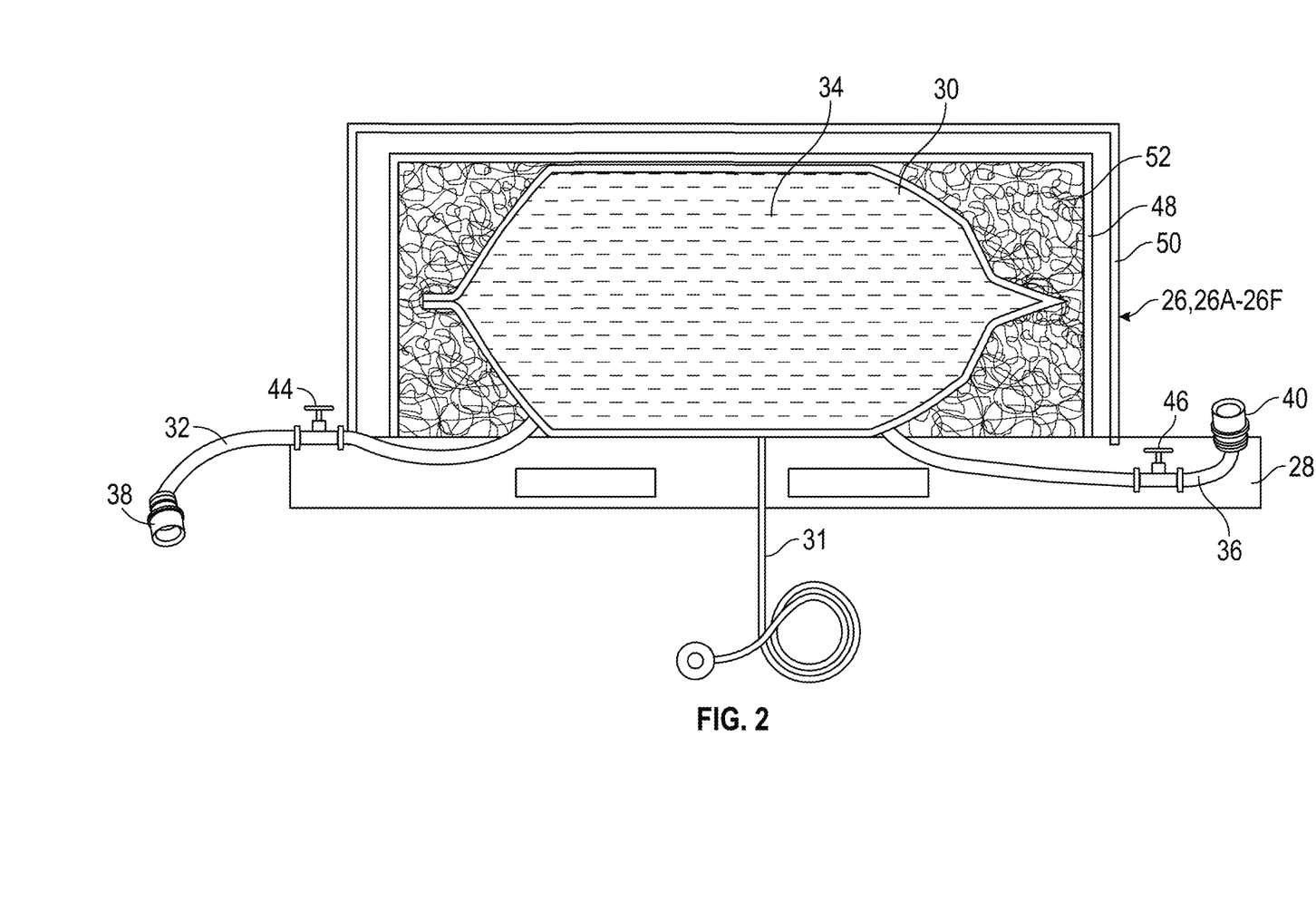
FIG. 2 is a schematic side elevation of a modular fuel container unit of the embodiment of the system shown in FIG. 1.

A modular fuel container unit 26, which is representative of the modular fuel container units 26A-26F of FIG. 1, is shown in FIG. 2. The modular fuel container unit 26 may include a separate pallet 28 that is shaped to fit within the cargo area 12 and includes rollers or other wheeled components for rolling the modular fuel container unit on and off of the cargo area 12 of the aircraft, and include locks to releasably secure the pallet at a predetermined location within the cargo area. The modular fuel container unit 26 also may include a fuel container 30 that is mounted on the pallet 28, so that each modular fuel container unit may consist of one fuel container mounted on one pallet. Each pallet 28 and fuel container 30 of a modular fuel container unit 26 remain connected to each other during use so that the pallet and fuel container move onto and off of the aircraft 14 as a unit. In this fashion, the modular fuel container units 26A-26F can be arranged within the cargo area 12 of the tanker aircraft 14 and secured in place in a variety of desirable patterns to accommodate load balancing requirements of the aircraft 14 and to use space available in the cargo area 12. In the example shown in FIG. 1, the container units 26A-26F may be arranged in three rows of two abreast in the cargo area 12.

As shown in FIG. 2, the fuel container 30 may include a bonding jumper 31, an outlet port and an inlet port. The outlet port may take the form of an outlet conduit 32 connected to and communicating with the interior 34 of the fuel container 30. The inlet port may take the form of an inlet conduit 36 connected to and communicating with the interior 34 of the fuel container 30. The outlet conduit 32 may include a hose connecter 38, and the inlet conduit 36 may include a connector 40 that may be fixed to the pallet 28. The hose connector 38 may be adapted to connect alternatively to the inlet conduit 40 of another one of the plurality of modular fuel container units 26A-26F and into a fuel port 42 in the cargo area 12 of the aircraft 14. The fuel port 42 may be connected to the main aircraft tanks 16 of the integral fuel system 25.

In an embodiment, the outlet conduit 32 and the inlet conduit 36 each may be in the form of a flexible hose, with both hoses connected to the interior 34 of the fuel container 30. Also in an embodiment, the fuel container 30 may take the form of a flexible bladder that is sufficiently flexible to collapse in response to emptying of fuel by gravity from the fuel container into the integral fuel system 25 of the aircraft 14. The outlet port (outlet conduit 32) also may include an outlet valve 44, and the inlet port (inlet conduit 36) may include an inlet valve 46. The outlet valve 44 may regulate fuel flow through the outlet port (outlet conduit 32) to, for example, the integral fuel system 25 of the aircraft. The inlet valve 46 may regulate fuel flow through the inlet port (inlet conduit 36) into the interior 34 of the container 30. In the embodiment shown in FIG. 2, the outlet valve 44 and inlet valve 46 each may take the form of a manually operated one-way valve. The inlet connector 40 may be adapted to connect alternatively to the hose connector 38 of the outlet conduit 32 of another one of the plurality of modular fuel container units 26A-26F and to a source of fuel (not shown) external to the aircraft for filling the fuel container 30 on the ground prior to the modular fuel container units are loaded onto the aircraft 14, or during flight of the aircraft from another tanker aircraft.

In embodiments, the fuel container 30, when in the form of a flexible bladder, may be made of a self-sealing membrane. Also in embodiments, the fuel container 30 may be housed within a rigid pallet shell 48, and in still other embodiments, the modular fuel container unit 26 may include a ballistic housing 50 that may be mounted on the pallet 28 and enclose the fuel container 30. Also in embodiments, a viscoelastic foam 52 may be placed between the fuel container 30 and the pallet shell 48 for dynamic load reduction.

The structure of the modular fuel container unit 26 of FIG. 2 enables the modular fuel container units 26A-26F to be connectable in a chain 54 as shown in FIG. 1, in which the outlet conduit 32 of one of the container units 26 is connected to the inlet conduit 36 of a next successive container unit. For example, as shown in FIG. 1, the outlet conduit 32 of container unit 26F may be connected to the inlet conduit 36 of container unit 26E, the outlet conduit 32 of container unit 26E may be connected to the inlet conduit of container unit 26D, and so on for container units 26D, 26C, and 26B. The outlet conduit 32 of container unit 26A may be connected to fuel port 42 so that the chain 54 of modular fuel container units 26A-26F may be connected to the integral fuel system 25 of the aircraft 14 through outlet conduit 32 of container unit 26A.

Fuel stored in each of the modular fuel container units 26A-26F flows through modular fuel container unit 26A and through the outlet conduit 32 of that container unit, which is connected to the fuel port 42. In an embodiment, the flexible bladders 30 of the modular fuel container units 26A-26F are selected to be sufficiently flexible to collapse by gravity simultaneously in response to the emptying of fuel from the fuel containers 30 of the modular fuel container units, so that the fuel levels within the fuel containers 30 of the fuel container units 26A-26F remain substantially equal to each other as the fuel is emptied from the system 10 into the integral fuel system 25 of the aircraft 14. In other embodiments and modes of operation of the system 10, the inlet valves 46 and outlet valves 44 of one or more, or all of the modular fuel container units 26A-26F may be individually adjusted to vary the fuel levels in the container units relative to each other as desired.

In an embodiment that may consist of only first and second modular fuel container units 26A, 26B, respectively, each having a fuel container 30 with an outlet port that may be connectable either to an inlet port of another fuel container or fuel port 42. The outlet port of the first fuel container 30 of first container unit 26A, in the form of outlet conduit 32, may be connected to the fuel port 42 and to the integral fuel system 25 of the aircraft 14. The inlet port in the form of inlet conduit 36 of the fuel container 30 of the first container unit 26A may be connected to the outlet port in the form of outlet conduit 32 of the fuel container 30 of the second container unit 26B. With that arrangement, fuel may flow from the interior 34 of the fuel container 30 of the second container unit 26B, through the outlet port in the form of conduit 32 of second container unit to the inlet port in the form of inlet conduit 36 to the interior 34 of fuel container 30 of first fuel container unit 26A, and from there out from the outlet port in the form of the outlet conduit 32 of container unit 26A to the fuel port 42.

Figure 3:
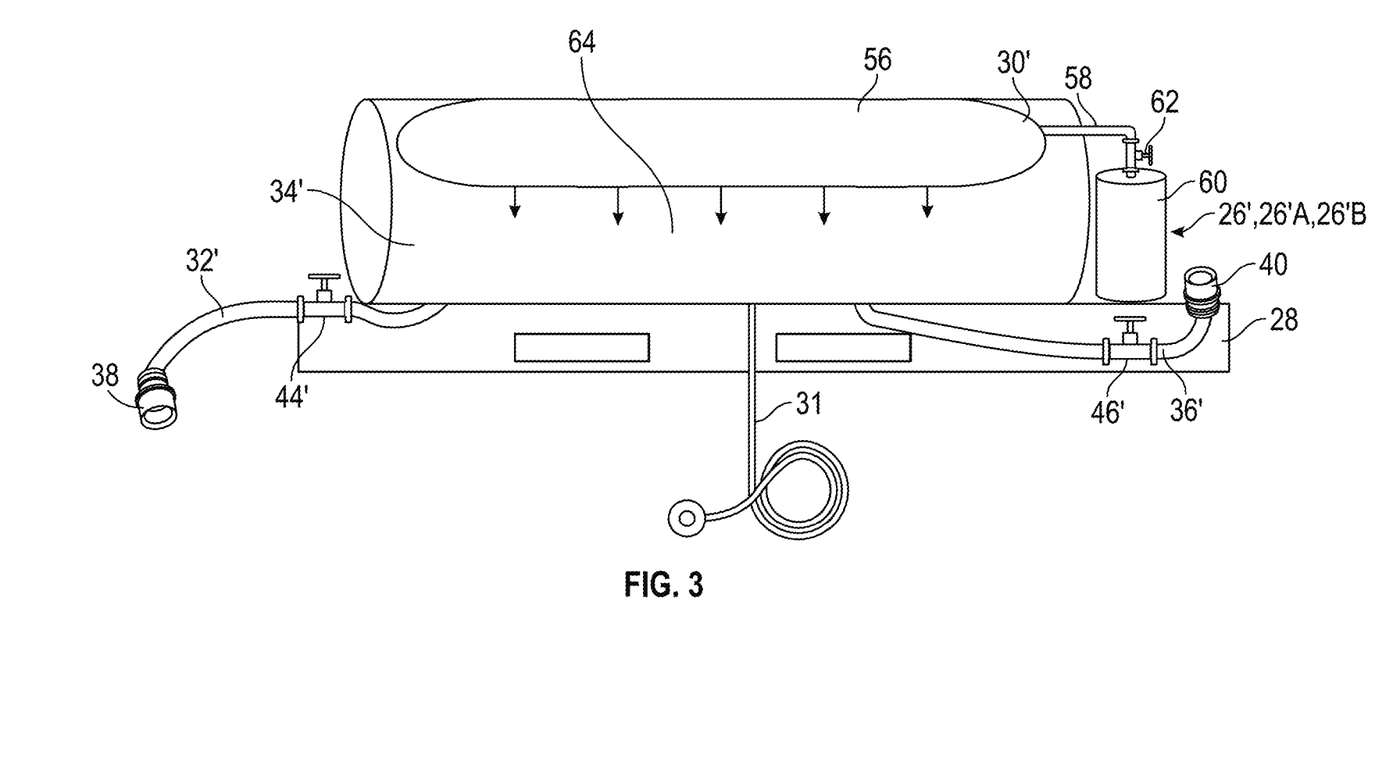
FIG. 3 is a schematic side elevation of a modular fuel container of another embodiment of the disclosed capacity extension system.
Figure 4:
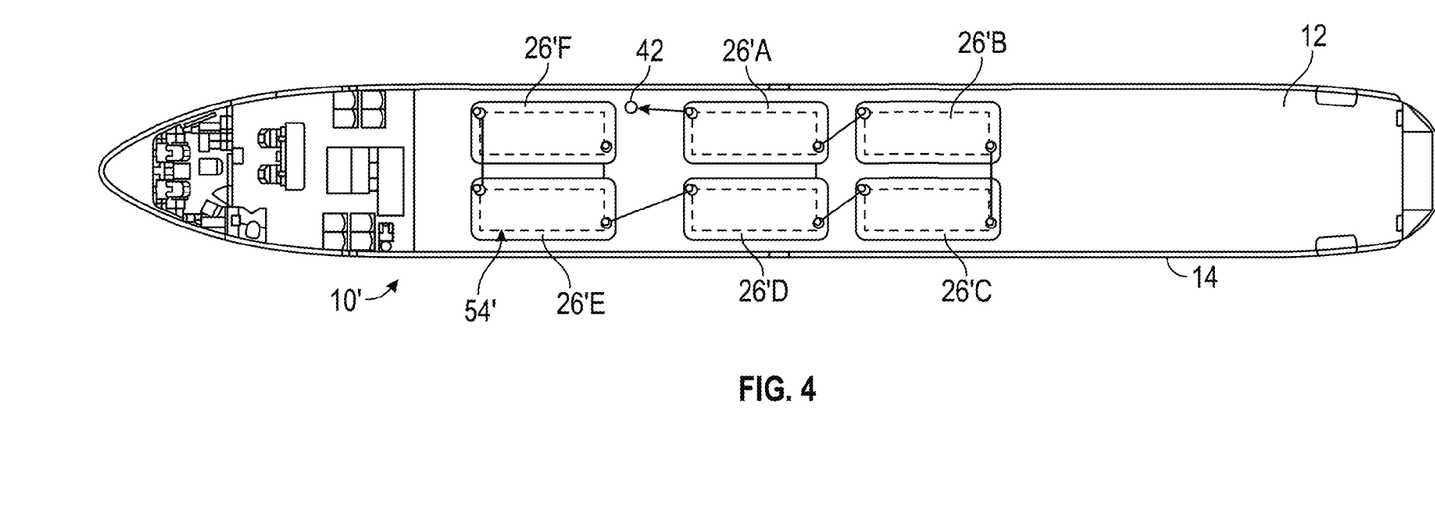
FIG. 4 is a schematic top plan view of a tanker aircraft having the embodiment of the disclosed capacity extension system of FIG. 3 mounted within its cargo area.

Another embodiment 10' of the aircraft tanker capacity extension system is shown in FIGS. 3 and 4. In this embodiment 10', a modular fuel container unit 26' may include a rigid fuel container 30', which optionally may be fitted with an aircraft bonding jumper 31, mounted on the pallet 28 and having a flexible bladder 56 mounted within its interior 34'. The flexible bladder 56 may be connected by a conduit 58 to a source of pressurized inert gas, such as nitrogen, which may take the form of a canister 60 mounted on the pallet 28 and regulated by adjustable valve 62. The valve 62 may be actuated to allow the pressurized inert gas within the canister 60 to selectively inflate or deflate the flexible bladder 56 within the rigid tank 30' to occupy a space above fuel 64 in the interior 34' of the container 30'.

In an embodiment, the system 10' of FIG. 4 may include a plurality of such modular fuel container units 26', each having its own container 60 of pressurized inert gas to inflate the bladder 56 in the interior 34' of the rigid tank 30. For example, in an embodiment in which there are only two such modular fuel container units 26'A, 26'B, within an aircraft, there would exist first and second fuel containers 30' having first and second flexible bladders 56 within first and second interiors 34' thereof, and the flexible bladders would be inflated and deflated by first and second canisters 60 by way of first and second valves 62 on board each of the pallets 28 associated with the tanks 30'.

The modular fuel container units 26'A-26'F of the system 10' may be arranged within the cargo area 12 of an aircraft 14, as shown in FIG. 4. The modular fuel container units, like the units 26A-26F of FIG. 1, may be connected in a chain 54', in which the outlet conduit 32' of one of the units 26'A-26'F may be connected to the inlet conduit 36' of a next adjacent one of the units, with the modular fuel container unit 26'A connected to the aircraft fuel port 42 within the cargo area 12. As with the system 10 of FIGS. 1 and 2, the modular fuel container units 26'A-26'F each may include an outlet port in the form of an outlet conduit 32', and an inlet port in the form of an inlet conduit 36'. Each outlet conduit 32' may include an outlet valve 44', which may take the form of a manually operated one-way valve, and similarly, each inlet conduit 36' may include an inlet valve 46' that may take the form of a manually operated one-way valve.

Figure 5:
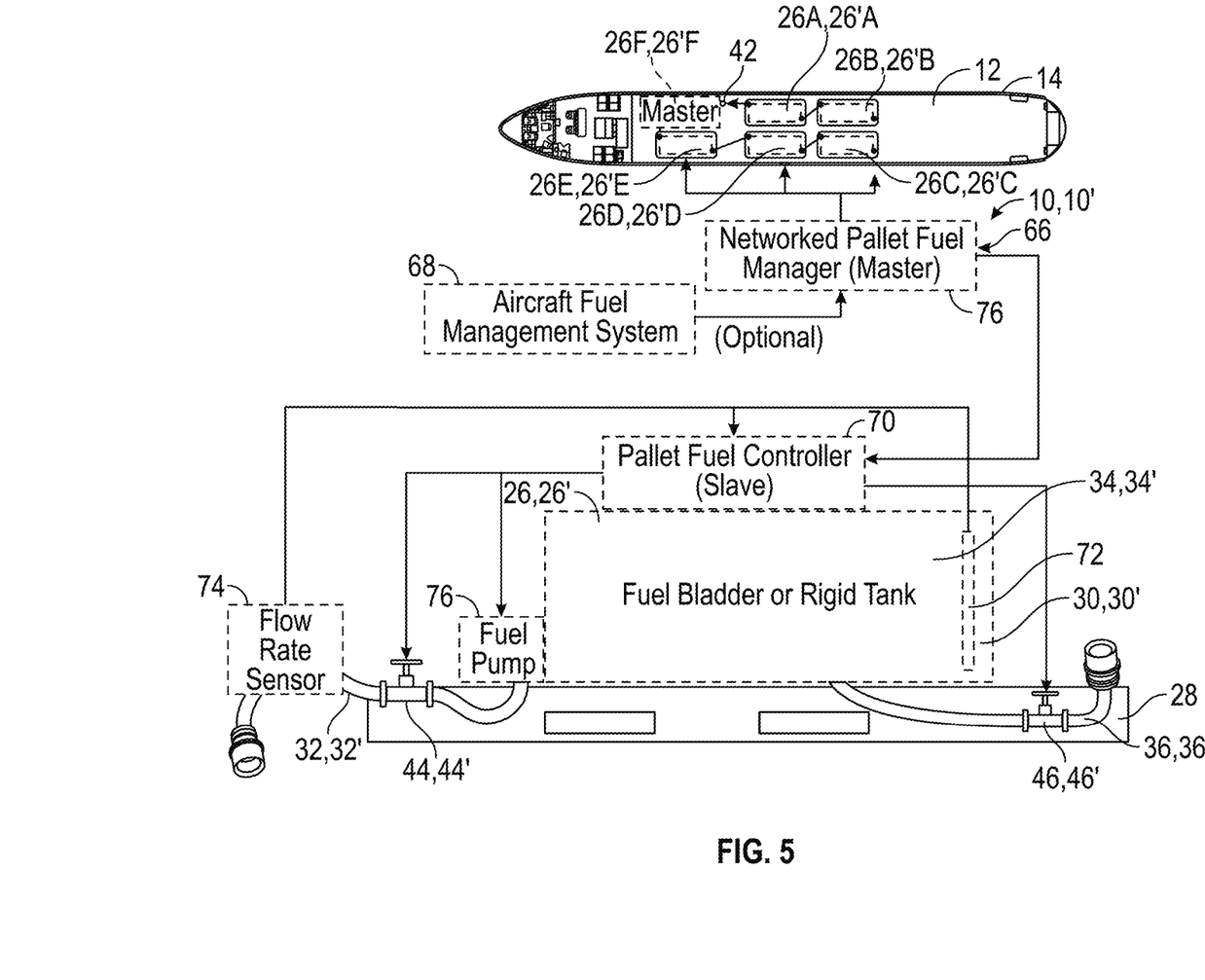
FIG. 5 is a schematic representation of a modular fuel container unit and optional fuel management controller system of the embodiments of FIGS. 1-4.

As shown in FIG. 5, embodiments of the systems 10, 10' may include a fuel management controller, generally designated 66, that may be connected to and communicate with the aircraft fuel management system 68 of the aircraft 14. The fuel management controller 66 also may include pallet fuel controllers 70, each of which may be mounted on, or connected to, a different one of each of the modular fuel container units 26A-26F, 26'A-26'F and include a level sensor 72 that is placed within the interior 34, 34' of the associated tank 30, 30'. The outlet valves 44, 44' on the outlet conduit 32' in these embodiments may take the form of valves that may be actuated by the pallet fuel controller 70. Similarly, the inlet valves 46, 46' may take the form of valves that may be actuated by the pallet fuel controller 70.

The system 10, 10' also may include a flowmeter or flow rate sensor 74 that monitors the fuel flow through the outlet conduit 30, 32' and provides data to the pallet fuel controller 70. The system 10, 10' may further include a fuel pump 76 that may be connected to and actuated by the pallet fuel controller 70 to control fuel flow from the tank 30, 30'. The controller 66 also may include a network pallet fuel manager (master) 76 that may control the pallet fuel controllers 70 for each of the modular fuel container units 26A-26F, 26'A-26'F.

The controller 66 may be programmed to maintain the fuel level in each of the tanks 34, 34' of the systems 10, 10' to be substantially the same in each tank as fuel flows from the system 10, 10' to the aircraft integral fuel system 25 through port 42. This may be accomplished by monitoring the flow rate of fuel from a container unit 26, 26' by way of flow rate sensor 74, and actuating valves 44, 44' and 46, 46' to regulate the amount of fuel flowing into and out of each of the tanks 30, 30' of the system 10, 10' during a refueling operation. By adjusting the inlet valves 46, 46' and the outlet valves 32, 32' to regulate fuel levels within each of the containers 30, 30', the system 10, 10' may maintain a desired center of gravity of the modular fuel container units 26A-26F, 26'A-26'F within the cargo area 12 of the aircraft 14 as fuel flows from the modular fuel container units into the aircraft integral fuel tank system 25.

Figure 6:
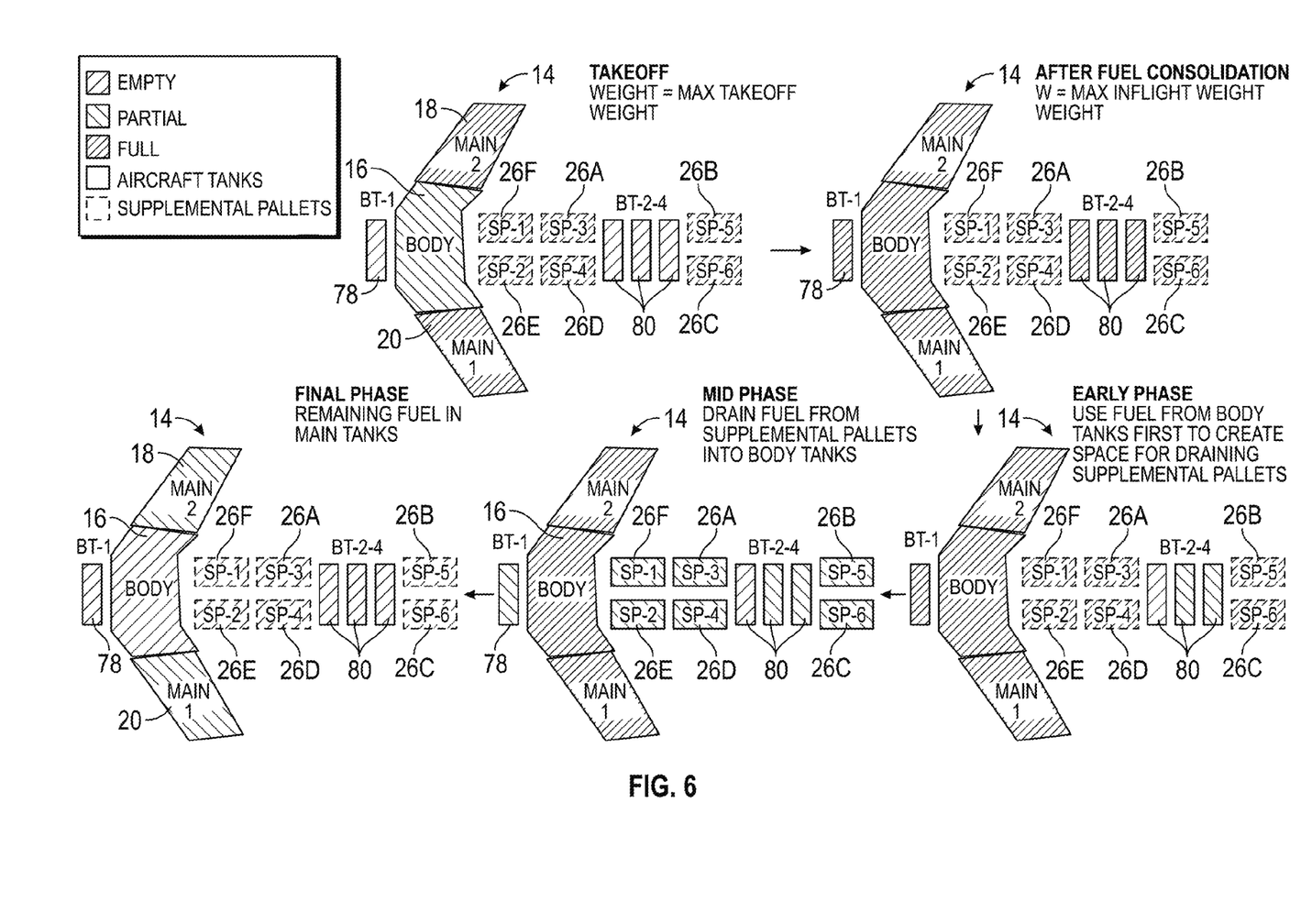
FIG. 6 is a schematic representation of an operational sequence of the disclosed method of operating the tanker aircraft capacity extension system.

As shown in FIG. 6, a method for extending fuel capacity of a tanker aircraft 14 may utilize the systems 10, 10' of FIGS. 1-5, and will be described with reference to the system 10. The method may begin with mounting a plurality of fuel containers 30 (FIG. 2) separately on a plurality of pallets 28 shaped to roll on and off of a cargo area 12 (see FIG. 1) to form a plurality of modular fuel container units 26A-26F. The outlet conduits 32 and the inlet conduits 36 are attached to the fuel containers 30. Each of the outlet conduits 32 is adapted to connect alternatively to the inlet conduit 36 of another one of the plurality modular fuel container units 26A-26F and to the fuel port 42 (FIG. 1) in the cargo area 12 of the aircraft 14, which in turn may be connected to the aircraft integral fuel system 25. Each of the inlet conduits 36 is adapted to connect alternatively to the outlet conduit 32 of another one of the plurality of modular fuel container units 26A-26F (in embodiments, the hose connector 38 of the outlet conduit 32 may be attachable to the connector 40 of the inlet conduit 36) and to a source of fuel external to the aircraft (not shown). Each of the outlet conduits 32 is provided with an adjustable outlet valve 44, and each of the inlet conduits 36 is provided with an adjustable inlet valve 46.

The fuel containers 30 of the plurality of modular fuel container units 26A-26F may be filled with fuel, which may be aviation fuel, and the filled container units then rolled into the cargo area 12 of an aircraft 14, which in an embodiment may be through a rear side cargo opening 77. The outlet conduit 32 of the fuel container 30 of container unit 26A may be connected to the fuel port 42 of the aircraft 14 via hose connector 38, and the fuel containers 30 of the remainder of the modular fuel container units 26A-26F may be connected to form a chain 54 (FIG. 1) of the plurality of fuel container units that in turn is connected to the container unit 26A, so that fuel stored in each of the fuel containers 26A-26F may flow through the chain 54 to the fuel container 30 of fuel container unit 26A connected to the fuel port 42.

At this point, the aircraft 14, now fully loaded with fuel in the modular fuel container units 26A-26F, may take off and become airborne. After one or more refueling operations, the fuel tanks 16, 18, 20 that may be integral with the aircraft become partially depleted of aviation fuel. At this time, the outlet valves 44 and the inlet valves 46 may be selectively actuated to regulate fuel flow between the fuel containers 30 of the fuel container units 26A-26F to maintain a desired fuel flow into the aircraft fuel tanks 16, 18, 20 and maintain a desired fuel level in the plurality of fuel containers 30 of the container units 26A-26F, thereby maintaining a desired center of gravity of the modular fuel container units 26A-26F within the cargo area 12 of the aircraft 14. With the embodiment 10 shown in FIGS. 1 and 2, the flexible bladders that comprise the fuel containers 30 deflate as fuel is conveyed or flows by gravity from the modular fuel container units 26A-26F through port 42 to the aircraft fuel tanks 16, 18, 20. The valves 44, 46 may be adjusted, either manually or by the fuel management controller 66 (see FIG. 5) to regulate fuel flow between modular fuel container units 26A-26F to maintain a desired level of fuel in the containers 30 as they are drained.

FIG. 6 shows a specific sequence of use of the system 10 (FIG. 1). As shown in the upper left of FIG. 6 labeled "Takeoff," body tanks 78, 80 may be empty, body tank 16 may be partially full, and tanks 18, 20 may be full. The filled modular fuel container units 26A-26F may be rolled onto the aircraft 14 into the cargo area 12. As shown in the upper right of FIG. 6, labeled "After Fuel Consolidation," the body tanks 78, 80 may be filled by way of in-flight fueling to the tanker aircraft 14 from another tanker aircraft. This method allows the aircraft 14 to carry more fuel than it is capable of taking off with. Alternatively, the aircraft 14 may take off with all tanks, including containers 30 of container units 26A-26F, full.

As shown in the lower right of FIG. 6 and labeled "Early Phase," the body tanks 80 may be used first to refuel aircraft 14 and/or a receiving aircraft (not shown) in mid-flight. As shown in the lower center of FIG. 6 and labeled "Mid Phase," fuel may be drained from the modular fuel container units 26A-26F into the body tanks 16, 80 and 78 of the integral fuel system 25. And as shown in the lower left of FIG. 6 and labeled "Final Phase," the fuel in the modular fuel container units 26A-26F may be off loaded entirely to a receiving aircraft (not shown), as is the fuel in the body tanks 16, 78, 80, leaving fuel in the tanks 18, 20 for use by the tanker aircraft itself to return.

The systems 10, 10' disclosed herein may be retrofitted onto existing tanker aircraft 14 without need of changing flight controls or aircraft system configuration. Accordingly, there is a low impact on the structure of the aircraft; no structural changes need to be made to the cargo area 12 of the aircraft to accommodate the modular fuel container units 26A-26F. This results in a lower cost for equivalent capability compared to larger aircraft or larger fleet size. The embodiments 10, 10', especially the embodiments of FIGS. 1 and 2, present a simple design, construction and operation, which may consist entirely of gravity feed and minor modulation of manually operated one-way valves 44, 46 of the modular fuel container units 26A-26F.

The systems 10, 10' therefore may provide a longer maximum range for a tanker aircraft 14, a higher fuel off load, and greater consolidation ability. By providing an increase in the fuel carrying capacity of the aircraft 14, better utilization of aircraft resources (i.e., tails, ramp space, missions, and crew) may be made. Further, the systems 10, 10' may significantly extend fighter drag capability in long deployment missions. Another advantage of the system 10, 10' is that there may not be a weight penalty when the auxiliary tanker capacity extension systems 10, 10' are not in use. This is because the modular fuel container units 26A-26F simply may be rolled off of the aircraft 14 when not needed. As a result, the design of the systems 10, 10' may allow greater tanker capacity with a smaller tanker aircraft footprint. The only modification to a conventional tanker aircraft 14 that needs to be made may be to install the fuel port 42 (FIG. 1) in the main cargo area 12, for example directly above the main or auxiliary fuel tank 16 of the aircraft 14.

While the systems and methods disclosed herein constitute preferred embodiments of the disclosed tanker aircraft capacity extension system and method, it is to be understood that the disclosure is not limited to these specific systems and methods of operation, and that changes may be made therein without departing from the scope of the disclosure.

What is claimed is:

1. A tanker aircraft capacity extension system shaped to fit within a cargo area of an aircraft, the system comprising:
   a first portable fuel container having a first outlet port connected to and communicating with an interior of the first fuel container and adapted to connect to an integral fuel system of the aircraft, and a first inlet port connected to and communicating with the interior of the first fuel container; and
   a second portable fuel container having a second outlet port connected to and communicating with an interior of the second fuel container and adapted to connect to the first inlet port of the first fuel container, and a second inlet port connected to and communicating with the interior of the second fuel container and adapted to connect to a third fuel container;
   whereby, when the second outlet port of the second fuel container is connected to the first inlet port of the first fuel container, and the first outlet port of the first fuel container is connected to the integral fuel system of the aircraft, fuel flows from the interior of the second fuel container, through the second outlet port to the first inlet port and into the interior of the first fuel container, and out from the interior of the first fuel container through the first outlet port of the first container.

2. The system of claim 1, wherein the first outlet port includes a first outlet conduit adapted to connect to the integral fuel system of the aircraft.

3. The system of claim 1, wherein the first inlet port includes a first inlet conduit adapted to connect to the second outlet port.

4. The system of claim 1, wherein the first fuel container and the second fuel container are mounted on first and second movable pallets, respectively, for rolling on and rolling off of the cargo area of the aircraft.

5. The system of claim 1, wherein the first fuel container is a first rigid tank having a first flexible bladder in the interior thereof, and includes a first source of pressurized inert gas connected to the first flexible bladder to selectively inflate and deflate the first flexible bladder to occupy a space above fuel in the interior of the first container; and
   wherein the second fuel container is a second rigid tank having a first flexible bladder in the interior thereof, and includes a second source of pressurized inert gas connected to the second flexible bladder to selectively inflate and deflate the second flexible bladder to occupy a space above fuel in the interior of the second container.

6. The system of claim 1, wherein the first fuel container and the second fuel container are first and second flexible bladders, respectively.

7. The system of claim 6, wherein the first and the second flexible bladders are sufficiently flexible to collapse in response to emptying of fuel from the interior of the first fuel container and from the interior of the second fuel container into the integral fuel system of the aircraft.

8. The system of claim 1, wherein the first outlet port includes a first outlet valve for regulating fuel flow through the first outlet port to the integral fuel system.

9. The system of claim 8, wherein the first outlet valve is a manually operated one-way valve.

10. The system of claim 1, wherein the first inlet port includes a first inlet valve for regulating fuel flow through the first inlet port into the interior of the first container.

11. The system of claim 10, wherein the first inlet valve is a manually operated one-way valve.

12. The system of claim 1, further comprising a first outlet valve connected to the first outlet port to regulate fuel flow from the interior of the first container, a first inlet valve connected to the first inlet port to regulate fuel flow into the interior of the first container, a second outlet valve connected to the second outlet port to regulate fuel flow from the interior of the second container to the first inlet port, and a second inlet valve connected to the second inlet port to regulate fuel flow into the interior of the second container.

13. The system of claim 12, further comprising a fuel management controller connected to actuate the first outlet valve, the first inlet valve, the second outlet valve, and the second inlet valve; the controller programmed to actuate the first outlet valve, the first inlet valve, the second outlet valve, and the second inlet valve to vary fuel flow between from the second container to the first container to maintain a fuel level in the first container substantially the same as a fuel level in the second container.

14. The system of claim 13, further comprising a flow meter connected to the first outlet port, a first level sensor in the interior of the first container for sensing the fuel level therein, and a second level sensor in the interior of the second container for sensing the fuel level therein, the flow meter, the first level sensor, and the second level sensor connected to provide data input to the fuel management controller.

15. An aircraft capacity extension system, the system comprising:
a plurality of modular fuel container units shaped to fit within a cargo area of an aircraft, each of the modular fuel container units including a separate pallet for rolling on and off of a cargo area of an aircraft and a fuel container mounted on the pallet;
each of the fuel containers having an outlet conduit connected to and communicating with an interior of that fuel container, and an inlet conduit connected to and communicating with the interior of that fuel container;
each of the outlet conduits is adapted to connect alternatively to the inlet conduit of another one of the plurality of modular fuel container units and to a fuel port in the cargo area of the aircraft connected to an aircraft fuel tank; and
each of the inlet conduits is adapted to connect alternatively to the outlet conduit of another one of the plurality of modular fuel container units and to a source of fuel external to the aircraft;
whereby the fuel containers of the plurality of modular fuel container units are connectable in a chain so that fuel stored in the interior of at least one of the fuel containers flows from the interior of the at least one fuel container, through the outlet conduit of the at least one fuel container, and into an interior of another one of the plurality of fuel containers through the outlet conduit of the another one of the plurality of modular fuel container units.

16. The system of claim 15, wherein each of the outlet conduits includes an outlet valve, and each of the inlet conduits includes an inlet valve, and wherein the inlet valves and the outlet valves regulate fuel flow between fuel containers of the plurality of modular fuel container units, and from the plurality of modular fuel container units to the fuel port.

17. The system of claim 16, wherein the inlet valves and the outlet valves are adjustable to regulate fuel levels within each of the containers to maintain a desired center of gravity of the plurality of modular fuel container units within the cargo area of the aircraft as fuel flows therefrom to the aircraft fuel tank.

18. A method for extending a fuel capacity of a tanker aircraft, the method comprising:
mounting a plurality of fuel containers on a plurality of pallets shaped to roll on and off of a cargo area of an aircraft to form a plurality of modular fuel container units;
attaching an outlet conduit and an inlet conduit to each of the fuel containers such that the outlet conduit and the inlet conduit both are attached to and communicate with the interior of the fuel container, wherein each of the outlet conduits is adapted to connect alternatively to the inlet conduit of another one of the plurality of modular fuel container units and to a fuel port in the cargo area of the aircraft connected to aircraft fuel tanks, and wherein each of the inlet conduits is adapted to connect alternatively to the outlet conduit of another one of the plurality of modular fuel container units and to a source of fuel external to the aircraft;
connecting a second one of the outlet ports of a second one of the fuel container to a first one of the inlet ports of a first one of the fuel containers, and connecting a first outlet port of the first fuel container to an integral fuel system of the aircraft, such that fuel flows from the interior of the second fuel container, through the second outlet port to the first inlet port and into to the interior of the first fuel container, and out from the interior of the first fuel container through the first outlet port of the first container; and
providing each of the outlet conduits with an adjustable outlet valve, and each of the inlet conduits with an adjustable inlet valve.

19. The method of claim 18, further comprising rolling the plurality of modular fuel container units into the cargo area of an aircraft; filling the plurality of fuel containers with fuel; connecting the outlet conduit of one of the plurality of fuel containers to the fuel port; and connecting the fuel containers of a remainder of the plurality of modular fuel container units to form a chain of the plurality of fuel container units that is connected to the one of the plurality of fuel containers so that the fuel stored in each of the fuel containers flows through the chain to the one of the plurality of fuel containers having the outlet conduit connected to the fuel port.

20. The method of claim 19, further comprising selectively actuating the outlet valves and the inlet valves to regulate fuel flow between the fuel containers of the fuel container units to maintain a desired fuel level in the plurality of fuel containers as fuel flows to the aircraft fuel tanks and thereby maintain a desired center of gravity of the plurality of modular fuel container units within the cargo area of the aircraft.

* * * * *